United States Patent
Moon et al.

(10) Patent No.: US 11,390,321 B2
(45) Date of Patent: Jul. 19, 2022

(54) COUPLING STRUCTURE OF SUSPENSION

(71) Applicants: Hyundai Motor Company, Seoul (KR); Kia Motors Corporation, Seoul (KR)

(72) Inventors: Ha Kyung Moon, Incheon (KR); Soon Huh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/095,502

(22) Filed: Nov. 11, 2020

(65) Prior Publication Data

US 2022/0041212 A1    Feb. 10, 2022

(30) Foreign Application Priority Data

Aug. 4, 2020  (KR) .......................... 10-2020-0097484

(51) Int. Cl.
    *B62D 7/18*    (2006.01)
    *B62D 7/20*    (2006.01)
    *B62D 7/16*    (2006.01)

(52) U.S. Cl.
    CPC .............. *B62D 7/18* (2013.01); *B62D 7/166* (2013.01); *B62D 7/20* (2013.01)

(58) Field of Classification Search
    CPC . B62D 7/18; B62D 7/166; B62D 7/20; B62D 7/06
See application file for complete search history.

(56) References Cited

U.S. PATENT DOCUMENTS

| | | | |
|---|---|---|---|
| 9,085,302 B2 | 7/2015 | Borroni-Bird et al. | |
| 2003/0111289 A1* | 6/2003 | Brill ...................... | B62D 5/0418 180/431 |
| 2003/0234504 A1* | 12/2003 | Frantzen ................ | B60G 15/07 280/93.512 |
| 2007/0045036 A1* | 3/2007 | Takeuchi ............. | B60G 17/005 180/411 |

(Continued)

FOREIGN PATENT DOCUMENTS

| CN | 106428198 A | * | 2/2017 |
|---|---|---|---|
| CN | 108297930 A | * | 7/2018 |

(Continued)

OTHER PUBLICATIONS

Polman, 'Machine Translation of WO 2015144482 A1 Obtained Nov. 9, 2021', Oct. 1, 2015, Entire Document. (Year: 2015).*

*Primary Examiner* — James A English
*Assistant Examiner* — Scott F. Underwood
(74) *Attorney, Agent, or Firm* — Morgan, Lewis & Bockius LLP

(57) ABSTRACT

A coupling structure of a suspension, may include a lower arm having one end portion engaged with a vehicle body, an assist knuckle in which a strut is located, a RevoKnuckle engaged with the assist knuckle, rotated independently from the assist knuckle, and configured to perform steering of a vehicle wheel, a steering input portion fixed to the vehicle body and configured to apply a steering force to the RevoKnuckle during steering, and a rotation transmission unit which is engaged with the RevoKnuckle and the steering input portion and has a length which is varied in a response to a wheel rebound of a vehicle.

13 Claims, 5 Drawing Sheets

(56) References Cited

U.S. PATENT DOCUMENTS

| | | | | |
|---|---|---|---|---|
| 2008/0303234 | A1* | 12/2008 | Me Cann | B62D 7/18 |
| | | | | 280/93.511 |
| 2011/0174568 | A1* | 7/2011 | Kuwabara | B62K 5/01 |
| | | | | 180/376 |
| 2014/0353054 | A1* | 12/2014 | Matayoshi | B60K 7/0007 |
| | | | | 180/55 |
| 2017/0232995 | A1* | 8/2017 | Brzezinski | F16D 3/06 |
| | | | | 74/493 |
| 2018/0170136 | A1* | 6/2018 | Gell | B60G 7/008 |
| 2019/0135067 | A1* | 5/2019 | Hintzen | F16F 9/3221 |
| 2019/0144034 | A1* | 5/2019 | Bertassi | B62D 7/18 |
| | | | | 280/93.512 |
| 2020/0070883 | A1* | 3/2020 | Du | B62D 5/0418 |
| 2020/0223478 | A1* | 7/2020 | Sano | B60K 7/0007 |

FOREIGN PATENT DOCUMENTS

| | | | | |
|---|---|---|---|---|
| DE | 102007047789 A1 * | 5/2009 | | B60G 3/20 |
| DE | 10 2017 216 983 A1 | 3/2019 | | |
| FR | 2896471 A3 * | 7/2007 | | B62D 5/0418 |
| KR | 10-2007-0103191 A | 10/2007 | | |
| WO | WO-2015144482 A1 * | 10/2015 | | B60G 7/006 |

\* cited by examiner

CROSS SECTION TAKEN ALONG LINE A-A

COUPLING STRUCTURE OF SUSPENSION

CROSS-REFERENCE TO RELATED APPLICATION

The present application claims priority to Korean Patent Application No. 10-2020-0097484 filed on Aug. 4, 2020, the entire contents of which is incorporated herein for all purposes by this reference.

BACKGROUND OF THE INVENTION

Field of the Invention

The present invention relates to a coupling structure of a suspension. More particularly, it relates to a coupling structure of a suspension, which includes a rotation transmission unit formed of a RevoKnuckle, a lower arm of the suspension, and a steering input portion and configured to allow a steering driving force applied from the steering input portion to the RevoKnuckle to be configured for absorbing displacement generated according to a wheel rebound.

Description of Related Art

A suspension for buffering vibration generated between a vehicle wheel and a road surface is provided in a portion of a vehicle in which the vehicle wheel is provided.

The suspension includes various types of suspensions, and a suspension suitable for a type of each vehicle is selected and applied.

For example, as shown in FIG. 1, there is a McPherson suspension. The McPherson suspension includes a knuckle 11, a shock absorber 12 provided in an upper portion of the knuckle 11 to absorb vibration, a lower arm 13 connected to a lower portion of the knuckle 11, and a stabilizer 14 connected to the lower portion of the knuckle 11 or a lower portion of the shock absorber 12.

The knuckle 11 includes a wheel mount portion in which a wheel W is provided in a center portion of the wheel mount portion, a shock absorber connector connected to the shock absorber 12 above the upper portion of the knuckle 11, and a lower arm connector connected to the lower arm 13 below the lower portion of the knuckle 11.

However, in the case of the above structure, when a steering force is applied to the knuckle 11 during steering, there is a structural limitation in that the steering force may be applied to a wheel only when the knuckle 11 is rotated simultaneously with an assist knuckle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an assist knuckle engaged with a lower arm and provides a RevoKnuckle which is located on a central axis of an assist knuckle and performs an independent rotation.

Furthermore, in another aspect, various aspects of the present invention provide a suspension technology configured for responding to displacement in a vertical direction and a width direction of a vehicle according to a wheel rebound through a rotation transmission unit located between a steering input portion and the RevoKnuckle.

Objectives of the present invention are not limited to the above-described objectives, and other objectives of the present invention, which are not mentioned, may be understood by the following description and also will be apparently understood through embodiments of the present invention. Furthermore, the objectives of the present invention may be implemented by means described in the appended claims and a combination thereof.

A coupling structure of a suspension for achieving the objectives of the present invention includes the following configuration.

The coupling structure of a suspension includes a lower arm having one end portion engaged with a vehicle body, an assist knuckle in which a strut is located, a RevoKnuckle engaged with the assist knuckle, rotated independently from the assist knuckle, and configured to perform steering of a vehicle wheel, a steering input portion fixed to the vehicle body and configured to apply a steering force to the RevoKnuckle during steering, and a rotation transmission unit which is engaged with the RevoKnuckle and the steering input portion and has a length which is varied in a response to a wheel rebound of a vehicle.

Furthermore, the rotation transmission unit may include a first rod engaged with an output end portion of the steering input portion, a second rod configured to pass through the assist knuckle to be engaged with the RevoKnuckle, and a variable rod located between the first rod and the second rod and engaged to the first rod and the second rod.

Furthermore, the variable rod may be configured to be rotatable in a first direction based on one end portion of the variable rod engaged with the first rod.

Furthermore, the variable rod may be configured to be rotatable in a second direction based on the other end portion of the variable rod engaged with the second rod.

Furthermore, the first direction may be different from the second direction thereof.

Furthermore, the variable rod may include a first variable rod engaged with the first rod, and a second variable rod including an insertion groove to allow the first variable rod to be inserted into the insertion groove and engaged with the second rod.

Furthermore, the coupling structure of the suspension may further include at least a protrusion located on external side of the first variable rod, and recesses formed in the insertion groove of the second rod to allow the at least a protrusion to be inserted into the recesses.

Furthermore, when an external force is applied between the steering input portion and the RevoKnuckle, the first variable rod may be configured to be variable in length along the insertion groove of the second variable rod.

Furthermore, the coupling structure of the suspension may further include a lubrication layer located in a region in which the first variable rod and the second variable rod are adjacent to each other.

Furthermore, the variable rod may be configured to be variable in length in a response to a change in trajectory of a center portion of the vehicle wheel according to a wheel rebound.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
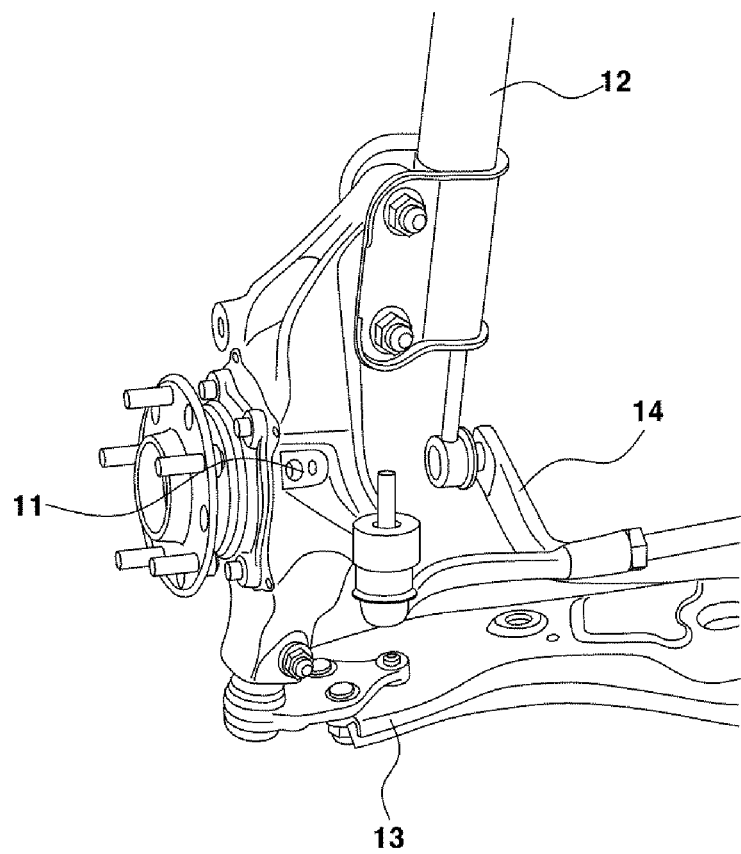
FIG. 1 is diagram illustrating a coupling relationship of a RevoKnuckle according to the related art.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings. The exemplary embodiments of the present invention may be modified in various forms, and the scope of the present invention may not be construed as being limited to the following embodiments. These embodiments are provided to more fully describe the present invention to those skilled in the art.

Furthermore, the term "~ knuckle," "~ unit," "~ portion," or the like used herein means a unit of processing at least one function or operation, and the present unit may be implemented by hardware or a combination of hardware.

Furthermore, in the present disclosure, the terms a first, a second, and the like are assigned to components to discriminate these components because names of the components are the same, but these terms are not necessarily limited to the order in the following description.

Furthermore, in the exemplary embodiment, the term a "wheel rebound" may be used as a meaning which includes all states in which a change of a wheel center portion occur due to application of an external force or the like.

Furthermore, a coupling structure of a suspension according to various exemplary embodiments of the present invention refers to one suspension engaged with each vehicle wheel, and in the case of a vehicle having a plurality of vehicle wheels, a coupling structure of a suspension configured for independently steering each vehicle wheel may be provided.

Hereinafter, embodiments will be described in detail with reference to the accompanying drawings, and in describing with reference to the accompanying drawings, the same or corresponding components are assigned the same reference numerals, and duplicate descriptions thereof will be omitted therein.

The present invention relates to a coupling structure of a suspension in which a RevoKnuckle 100 is located in an assist knuckle 200 and configured to be independently rotated with respect to the assist knuckle 200.

Furthermore, the coupling structure of a suspension according to various exemplary embodiments of the present invention includes a structure which is engaged with each vehicle wheel to be configured for being independently steered. Thus, a vehicle wheel mounting the corresponding coupling structure of a suspension may be configured to have a steering angle of 60 degrees for an external ring and a steering angle of 90 degrees for an internal ring.

Figure 2:
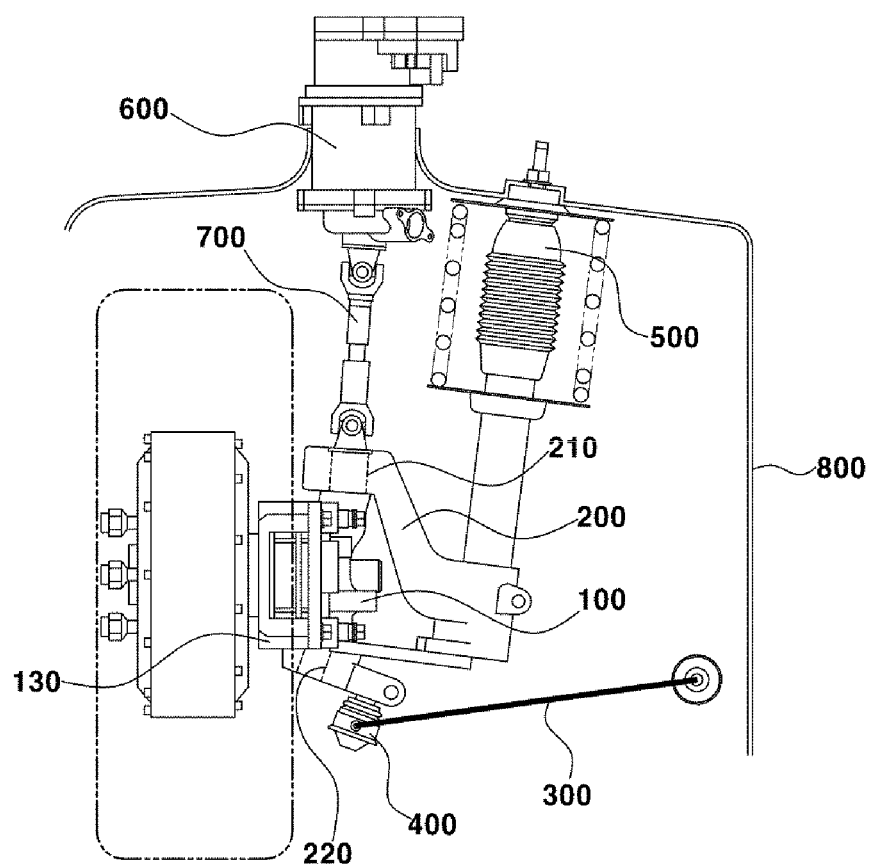
FIG. 2 is a front view exemplarily illustrating a coupling structure of a suspension according to various exemplary embodiments of the present invention.

FIG. 2 is a perspective view exemplarily illustrating the coupling structure of a suspension according to various exemplary embodiments of the present invention.

The present invention includes a lower arm 300 engaged with a vehicle body 800 or a frame and located in a width direction of the vehicle, and the assist knuckle 200 configured to be located at one end portion of the lower arm 300. The strut 500 located at an upper end portion of the assist knuckle 200 is used as a concept including a shock absorber.

Since the RevoKnuckle 100 is included to be located in a recessed space of the assist knuckle 200 and final end portions of the RevoKnuckle 100 are engaged in both extending end portions of the assist knuckle 200, one surface of the RevoKnuckle 100 includes a wheel mount portion 130 in which the vehicle wheel is mounted.

In various exemplary embodiments of the present invention, the RevoKnuckle 100 includes an upper end portion and a lower end portion to be engaged between an upper end hole 210 and a lower end hole 220 of the assist knuckle 200. The RevoKnuckle 100 is rotated about a central axis of the upper end hole 210 and the lower end hole 220. Thus, the RevoKnuckle 100 has a rotation axis which is the same as a central axis connecting the upper end hole 210 of the assist knuckle 200 to the lower end hole 220 thereof.

Furthermore, the present invention includes a steering input portion 600 fixed to the vehicle body 800 and configured to be engaged with the RevoKnuckle 100 to allow a steering force to be applied in a response to a steering input of a user. In various exemplary embodiments of the present invention, the steering input portion 600 may be formed of a steering motor configured to receive an electronic signal to change a steering angle of the RevoKnuckle 100. In a state of being parallel to the strut 500, the steering input portion 600 may be configured to be coupled to each assist knuckle 200. In various exemplary embodiments of the present invention, it is configured such that the strut 500 is engaged with a lower end portion of the assist knuckle 200, and a rotational force of the steering input portion 600 is applied to the RevoKnuckle 100 through a rotation transmission unit 700 located between the upper end hole 210 of the assist knuckle 200 and the steering input portion 600.

The one end portion of the lower arm 300 and a lower end portion of the assist knuckle 200 are configured to be coupled through an engagement unit 400. The engagement unit 400 is configured to be prevented from being rotated about a central axis in a height direction of the assist knuckle 200 and configured to absorb a front-rear movement and a left-right movement which are applied from the vehicle wheel. Thus, the RevoKnuckle 100 may independently perform a rotation in the assist knuckle 200 so that the assist knuckle 200 may be maintained in a state of being fixed to the lower arm 300 and the strut 500.

The engagement unit 400 is configured at a position adjacent to the lower end hole 220 of the assist knuckle 200 into which a lower end portion of the RevoKnuckle 100 is inserted. In various exemplary embodiments of the present invention, a U-joint may be applied as the engagement unit 400.

The rotation transmission unit 700 located between the RevoKnuckle 100 and the steering input portion 600 and configured to be engaged with an upper end portion of the RevoKnuckle 100 is included. The rotation transmission unit 700 includes a first rod 710 configured to be engaged with a driveshaft of the steering input portion 600, a second rod 730 configured to pass through the upper end hole 210 of the assist knuckle 200 to be engaged with the upper end portion of the RevoKnuckle 100, and a variable rod 720 connected to the first rod 710 and the second rod 730.

In a state in which the vehicle is stopped or a driving state in which a wheel rebound is not present, the rotation transmission unit 700 is configured such that the driveshaft of the steering input portion 600 is coaxially located with a rotation axis of the RevoKnuckle 100. Furthermore, the first rod 710 is configured to transmit a rotational force of the driveshaft of the steering input portion 600 to the variable rod 720 and the second rod 730 to allow a steering input of the RevoKnuckle 100 to be possible.

The variable rod 720 is formed of a first variable rod 721 and a second variable rod 723 to be variable in a longitudinal direction of the rotation transmission unit 700. The first variable rod 721 is configured to be inserted into the second variable rod 723 in a response to a change in trajectory of a center portion of the vehicle wheel according to a wheel rebound.

Furthermore, the variable rod 720 is configured to be rotated on a predetermined plane based on one end portion of the variable rod 720 engaged with the first rod 710. Furthermore, the other end portion of the variable rod 720 is engaged with the second rod 730, and the variable rod 720 is configured to be rotated on another plane based on the other end portion of the variable rod 720.

That is, the variable rod 720 is configured such that a degree of freedom of rotation is applied to the two end portions of the variable rod 720 based on the one end portion engaged with the first rod 710 and the other end portion engaged with the second rod 730. In various exemplary embodiments of the present invention, the variable rod 720 is configured to be rotated in a first direction based on a final end portion of the first rod 710 and configured to be rotated in a second direction based on a final end portion of the second rod 730. Furthermore, the variable rod 720 may be formed as one rigid body which is configured for being moved in the longitudinal direction thereof. Thus, a variation in length of the variable rod 720, a rotation angle of the variable rod 720 based on one end portion of the first rod 710, and a rotation angle of the variable rod 720 based on an upper end portion of the second rod 730 are configured to be interlocked with each other.

As described above, when a wheel rebound is generated, the variable rod 720 is configured to respond to the change in trajectory of the center portion of the vehicle wheel through the variation in the longitudinal direction of the rotation transmission unit 700 and the changes in rotation in first direction and second direction thereof.

Figure 3:
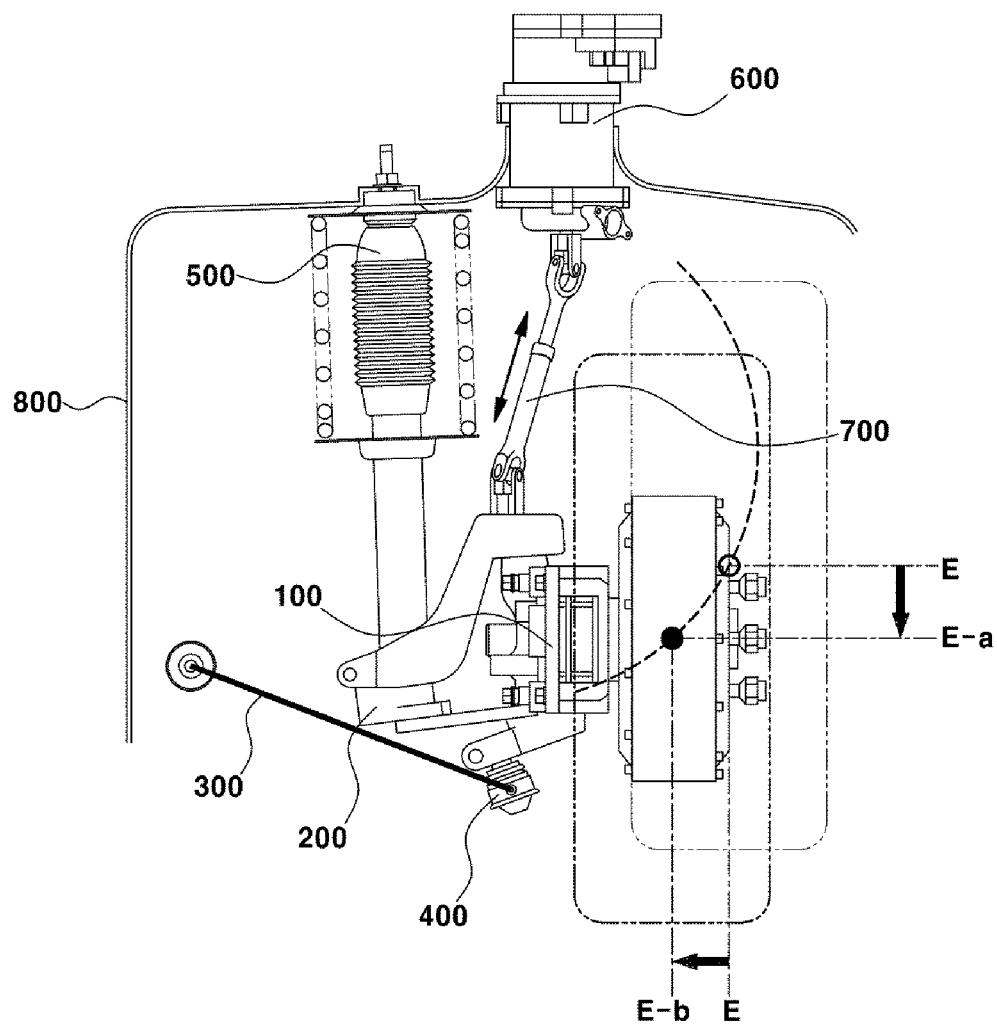
FIG. 3 is an operation diagram illustrating the coupling structure of a suspension in a state of a wheel rebound according to various exemplary embodiments of the present invention.

FIG. 3 illustrates a movement of the coupling structure of a suspension when a change in trajectory of the center portion of the vehicle wheel is applied according to generation of the wheel rebound according to various exemplary embodiments of the present invention.

When the wheel rebound is generated, since changes in height direction and width direction are applied to a trajectory of the center portion of the vehicle wheel, the coupling structure of a suspension is configured such that the trajectory of the center portion of the vehicle wheel is moved downwards from a position E to a position E-a based on the height direction thereof. Furthermore, when the wheel rebound is generated, the trajectory of the center portion of the vehicle wheel is not simply moved downwards but is configured to be moved along a trajectory of the lower arm 300. That is, the trajectory of the center portion of the vehicle wheel is rotated and moved in a clockwise direction based on the illustrated drawing. Thus, when the wheel rebound is generated, the trajectory of the center portion of the vehicle wheel is moved downwards in the height direction, and simultaneously, moved inward in the width direction thereof.

When the trajectory of the center portion of the vehicle wheel is rotated in the clockwise direction due to the trajectory of the lower arm 300, the rotation transmission unit 700 is configured to be elongated in the longitudinal direction thereof, and the variable rod 720 is rotated inward the vehicle based on the one end portion of the first rod 710. Furthermore, the other end portion of the variable rod 720 connected to one end portion of the second rod 730 is moved to incline the variable rod 720 in a direction away from the vehicle.

That is, the variable rod 720 is configured to absorb gap variations in the height direction and the width direction thereof, which are generated between the steering input portion 600 fixed to the vehicle body 800 and the RevoKnuckle 100 which is moved by being interlocked with a movement of the trajectory of the center portion of the vehicle wheel, allowing a continuous steering input to be performed. In various exemplary embodiments of the present invention, the first variable rod 721 is configured to be elongated or compressed in the longitudinal direction based on the second variable rod 723 in a response to the movement of the center portion of the vehicle wheel in the height direction thereof, and the variable rod 720 is configured to be rotated based on the one end portion of the first rod 710 and the one end portion of the second rod 730 in a response to the movement of the center portion of the vehicle wheel in the width direction thereof.

In brief, in a response to the movement of the trajectory of the center portion of the vehicle wheel in the height direction thereof, the rotation transmission unit 700 undergoes elongation or compression in the longitudinal direction, and in a response to the movement of the trajectory of the center portion of the vehicle wheel in the width direction thereof, the variable rod 720 is coupled to be rotated based on the two end portions thereof engaged with the steering input portion 600 and the RevoKnuckle 100.

Figure 4:
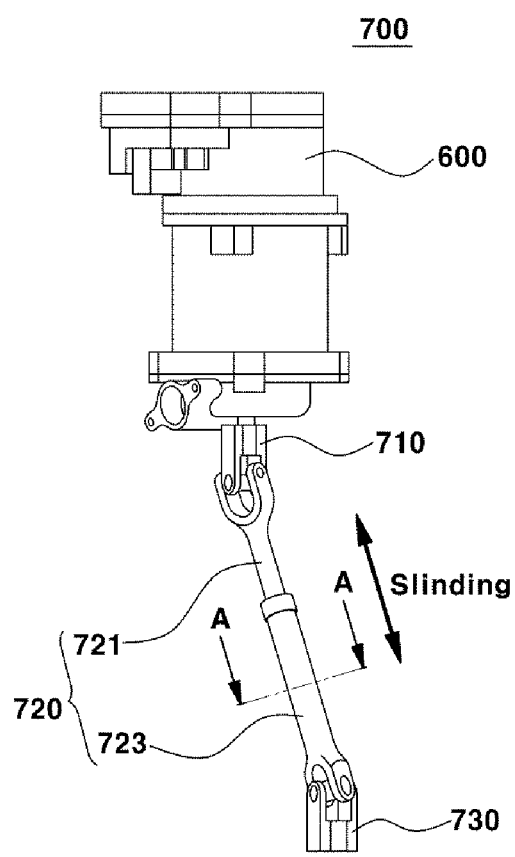
FIG. 4 is a configurational diagram illustrating a rotation transmission unit of the coupling structure of a suspension according to various exemplary embodiments of the present invention.

FIG. 4 illustrates a configuration of the rotation transmission unit 700 according to various exemplary embodiments of the present invention.

In various exemplary embodiments of the present invention, the first rod 710 engaged with a lower end portion of the steering input portion 600 is included, and the second rod 730 configured to be engaged with the RevoKnuckle 100 and the variable rod 720 located at a lower end portion of the first rod 710 and the upper end portion of the second rod 730 are provided. The first rod 710 is configured to be engaged with the driveshaft of the steering input portion 600 to be rotated along a rotation direction of the driveshaft. Furthermore, the second rod 730 is configured to be integrally rotated with the RevoKnuckle 100 due to a rotational force applied from the variable rod 720. That is, the first rod 710 is configured to transfer only the movement, which is interlocked with the rotational force of the steering input portion 600, to the variable rod 720, and the second rod 730 is configured to transfer only a rotational force applied to a rotational central axis of the RevoKnuckle 100 among the driving forces applied from the variable rod 720.

The variable rod 720 includes the first variable rod 721 engaged with the lower end portion of the first rod 710 and the second variable rod 723 including an insertion groove 724 to allow at least a portion of the first variable rod 721 to be inserted into the insertion groove 724. The first variable rod 721 is configured to be engaged with the one end portion of the first rod 710 to allow the variable rod 720 to be rotated in the first direction thereof. A lower end portion of the second variable rod 723 is configured to be engaged with the upper end portion of the second rod 730 to allow the variable rod 720 to be rotated in the second direction based on the upper end portion of the second rod 730.

In various exemplary embodiments of the present invention, the first direction and the second direction mean movements on a single plane formed based on the height direction of the vehicle and thus may be the same direction thereof. Furthermore, in another exemplary embodiment of the present invention, the first direction and the second direction may be different directions, and the first direction and the second direction are located on planes perpendicular to each other based on the height direction thereof. The first direction and the second direction in which the variable rod 720 is rotated are set according to a link structure at a position at which the first rod 710, the variable rod 720, and the second rod 730 are engaged with each other, and thus a rotation direction may be changed according to an application type.

Figure 5:
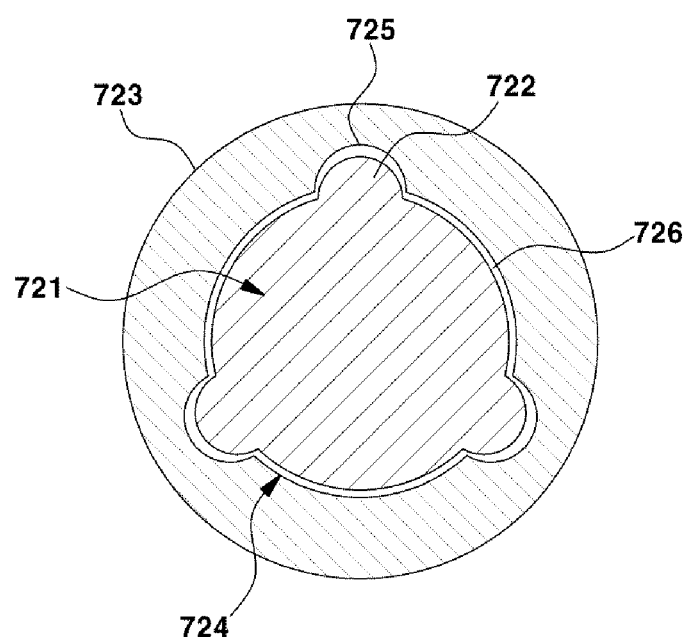
FIG. 5 is a side cross-sectional view exemplarily illustrating the rotation transmission unit of the coupling structure of a suspension according to various exemplary embodiments of the present invention.

FIG. 5 illustrates a side cross-sectional view taken along line A-A shown in FIG. 4.

The illustrated side cross-sectional view shows a state in which the first variable rod 721 is engaged with the second variable rod 723, and at least a portion of the first variable rod 721 is inserted into and located in the insertion groove 724 of the second variable rod 723. Furthermore, a lubrication layer 726 is configured to be located between the first variable rod 721 and the second variable rod 723 to reduce noise and friction generated when the first variable rod 721 is moved along the second variable rod 723 and an interior of the insertion groove 724.

Furthermore, at least a protrusion 722 are included on an external side of the first variable rod 721, and recesses 725 are included on an internal surface of the second variable rod 723 at positions corresponding to the at least a protrusion 722. Thus, when the first variable rod 721 receives the rotational force from the first rod 710, it is configured such that the rotational force is applied to the second variable rod 723 through the at least a protrusion 722.

That is, since the first variable rod 721 may be configured to be moved along an internal side of the second variable rod 723 in the longitudinal direction, and at the same time, the rotational forces may be simultaneously applied based on a central axis of the first variable rod 721, it is configured such that the rotating force applied to the first variable rod 721 through the at least a protrusion 722 is transferred to the second variable rod 723.

The present invention can obtain the following effects according to a combination of the above-described embodiments and a configuration, which will be described below, and a use relationship.

In accordance with various aspects of the present invention, a RevoKnuckle which is independently rotated from an assist knuckle is included so that there is an effect of providing a high degree of freedom of a suspension.

Furthermore in accordance with various aspects of the present invention, there is an effect of providing structural stability which can absorb displacement according to a behavior of the suspension through a rotation transmission unit which is varied in a height direction and a width direction in a response to generation of a wheel rebound.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A coupling structure of a suspension, the coupling structure comprising:
   an assist knuckle in which a strut is located;
   a knuckle engaged with the assist knuckle, rotated independently from the assist knuckle, and configured to perform steering of a vehicle wheel;

a steering input portion fixed to a vehicle body and configured to apply a steering force to the knuckle during steering; and a rotation transmission unit which is engaged with the knuckle and the steering input portion and has a length which is varied in a response to a wheel rebound of a vehicle, wherein a lower arm is engaged with the vehicle body and an end portion of the assist knuckle, and wherein one end portion of the lower arm and a lower end portion of the assist knuckle are coupled through an engagement unit which is configured to be prevented from being rotated about a central axis in a height direction of the assist knuckle and configured to absorb a front-rear movement and a left-right movement which are applied from the vehicle wheel.

2. The coupling structure of claim 1, wherein the rotation transmission unit includes:
   a first rod engaged with an output end portion of the steering input portion;
   a second rod configured to pass through the assist knuckle to be engaged with the knuckle; and
   a variable rod located between the first rod and the second rod and engaged to the first rod and the second rod.

3. The coupling structure of claim 2, wherein the assist knuckle includes an upper end hole and the second rod is aligned to pass through the upper end hole of the assist knuckle to be engaged with an upper end portion of the knuckle.

4. The coupling structure of claim 2, wherein the variable rod is rotatable in a first direction based on a first end portion of the variable rod engaged with the first rod.

5. The coupling structure of claim 4, wherein the variable rod is rotatable in a second direction based on a second end portion of the variable rod engaged with the second rod.

6. The coupling structure of claim 5, wherein the first direction is different from the second direction.

7. The coupling structure of claim 2, wherein the variable rod includes:
   a first variable rod engaged with the first rod; and
   a second variable rod slidably engaged to the first variable rod and engaged with the second rod.

8. The coupling structure of claim 7, wherein the second variable rod includes an insertion groove to allow the first variable rod to be inserted into the insertion groove.

9. The coupling structure of claim 8, further including:
   at least a protrusion located on an external side of the first variable rod; and
   recesses formed in the insertion groove of the second rod to allow the at least a protrusion to be inserted into the recesses.

10. The coupling structure of claim 8, wherein, when an external force is applied between the steering input portion and the knuckle, the first variable rod is configured to be variable in length along the insertion groove of the second variable rod.

11. The coupling structure of claim 8, further including:
    a lubrication layer located in a region in which the first variable rod and the second variable rod are adjacent to each other.

12. The coupling structure of claim 2, wherein the variable rod is variable in length in a response to a change in trajectory of a center portion of the vehicle wheel according to the wheel rebound.

13. The coupling structure of claim 1, wherein the engagement unit is a U-joint.

* * * * *